US007667904B2

(12) United States Patent
Lewis et al.

(10) Patent No.: US 7,667,904 B2
(45) Date of Patent: Feb. 23, 2010

(54) EDITABLE INSTRUMENT ASSEMBLY

(75) Inventors: Briggs Ricky-Dale Lewis, Monroe, WA (US); William Michael Creel, Federal Way, WA (US); Martin Jay Caspe-Detzer, Fall City, WA (US); John Charles Luoma, Seattle, WA (US); Ian David O'Connor, Seattle, WA (US); Theodore Joseph Scherzinger, Sammamish, WA (US)

(73) Assignee: PACCAR Inc, Bellevue, WA (US)

( * ) Notice: Subject to any disclaimer, the term of this patent is extended or adjusted under 35 U.S.C. 154(b) by 383 days.

(21) Appl. No.: 11/077,972

(22) Filed: Mar. 11, 2005

(65) Prior Publication Data

US 2006/0201040 A1  Sep. 14, 2006

(51) Int. Cl.
*G02B 7/02* (2006.01)
*G02B 5/124* (2006.01)
*B60R 25/10* (2006.01)

(52) U.S. Cl. .................. 359/811; 359/819; 359/533; 340/426.24; 340/426.25

(58) Field of Classification Search ................ 359/811, 359/819, 813; 340/425.5, 428, 426.15
See application file for complete search history.

(56) References Cited

U.S. PATENT DOCUMENTS

| 2,877,584 | A | | 3/1959 | Dupree | |
|---|---|---|---|---|---|
| 3,618,078 | A | | 11/1971 | Wittman et al. | |
| 4,216,524 | A | | 8/1980 | Leveraus | |
| 4,240,722 | A | * | 12/1980 | Brecht ..................... | 353/12 |
| 4,447,860 | A | | 5/1984 | Stone et al. | |
| 5,383,297 | A | | 1/1995 | Summerville et al. | |
| 6,125,566 | A | * | 10/2000 | McLaughlin ............. | 40/737 |
| 6,490,776 | B1 | | 12/2002 | Gager et al. | |
| 6,756,897 | B2 | | 6/2004 | Mizukami et al. | |
| 7,310,071 | B2 | * | 12/2007 | Cuprys ..................... | 345/7 |

* cited by examiner

*Primary Examiner*—Ricky L Mack
*Assistant Examiner*—Brandi N Thomas
(74) *Attorney, Agent, or Firm*—Christensen O'Connor Johnson Kindness PLLC

(57) ABSTRACT

An editable instrument assembly (100) for a vehicle. The editable instrument assembly includes a plurality of lenses (110), each lens having an icon (112) disposed thereon and a lens frame (108). The lens frame is adapted to removably receive each of the plurality of lenses. The editable instrument assembly also includes an instrument panel (102) comprising a lens frame receiving assembly (160) for removably and slidably receiving the lens frame with the plurality of lenses.

15 Claims, 5 Drawing Sheets

EDITABLE INSTRUMENT ASSEMBLY

FIELD OF THE INVENTION

The present invention generally relates to instrument assemblies for vehicles, and more specifically to instrument assemblies for vehicles which are editable.

BACKGROUND OF THE INVENTION

Vehicle instrumentation often includes a plurality of indicator lights, each indicator light indicating a status or condition of a selected component of the vehicle. A lens is associated with each indicator light. Each lens has an icon on the lens which indicates a status or condition of the component with which the indicator light is associated. For instance, a indicator light associated with a gas tank fuel gauge is associated with a lens having an icon of a gas pump on the lens. The indicator light goes on when the gas tank fuel gauge senses a near empty gas tank, thereby illuminating the lens and revealing to the user the icon and the status of the fuel tank.

In previously developed instrument assemblies, a front face of the instrument assembly is printed with a large number of icons, the icons representing all possible options a user could purchase. A plurality of indicator lights are then placed in the instrument assembly behind the icons associated with the options actually purchased. Although effective, these previously developed instrument assemblies are not without their problems.

For instance, one instrumentation assembly is manufactured having all possible icons and a socket disposed behind each icon for receiving a light bulb. Then for users who do not purchase all possible options, the sockets associated with the non-purchased options are not filled with a light bulb and remain empty. Thus, the instrumentation assembly is over-built for most users. Further, if a new option is developed not available at the time of manufacture, the icons of the instrument assembly cannot be edited or changed to accommodate the new option. Also, since the front face of the instrument panel is not easily removed from the instrument panel, when the instrument panel must be removed and taken apart to remove the front face, a significant amount of labor is expended. Additionally, in previously developed instrument assemblies, during installation, often either the lens, icons, or the front face itself are mistakenly oriented incorrectly during installation, and thus must be removed and replaced or reoriented.

Accordingly, there exists a need for an instrument assembly that is editable so that the instrument assembly can be edited to have only the icons that specifically match the options purchased. Further, there exists a need for an instrument assembly that is editable so that if an option is added to the vehicle, the icons of the instrument assembly can be easily edited to accommodate the added option. Additionally, there exists a need for an instrument assembly wherein the lenses can be easily removed from the instrument panel. Further still, there exists a need for an instrument assembly that is resistant to the parts being installed in the wrong orientation during installation.

SUMMARY OF THE INVENTION

One embodiment of an editable instrument assembly formed in accordance with the present invention is disclosed. The editable instrument assembly includes a plurality of lenses, each lens having an icon disposed thereon and a lens frame. The lens frame is adapted to removably receive each of the plurality of lenses. The editable instrument assembly also includes an instrument panel comprising a lens frame receiving assembly for removably and slidably receiving the lens frame with the plurality of lenses.

Another embodiment of an editable instrument assembly formed in accordance with the present invention is disclosed. The editable instrument assembly includes a plurality of lenses, each lens having an icon disposed thereon and a lens frame. The lens frame is adapted to removably receive each of the plurality of lenses. The editable instrument assembly also includes an instrument panel comprising a lens frame receiving assembly for removably receiving the lens frame with the plurality of lenses. The lens frame and each of the plurality of lenses are cooperatively shaped such that each of the plurality of lenses is only able to be orientated in a single predetermined direction when removably received by the lens frame.

One embodiment of an editable lens assembly formed in accordance with the present invention and adapted to be removably received by an instrument panel of a vehicle is disclosed. The editable lens assembly includes a plurality of lenses, each lens having an icon disposed thereon and a lens frame. The lens frame includes a lens frame adapted to removably receive the plurality of lenses, wherein each of the plurality of lenses and the lens frame are cooperatively shaped so that each of the plurality of lenses are receivable by the lens frame in only a single orientation. The editable lens assembly also includes an insertion tab removably coupled to the lens frame.

Another embodiment of an editable lens assembly formed in accordance with the present invention that is adapted to be slidably received by an instrument panel of a vehicle is disclosed. The editable lens assembly includes a plurality of lenses, each lens having an icon disposed thereon and a lens frame adapted to removably receive the plurality of lenses. Each of the plurality of lenses and the lens frame are cooperatively shaped so that each of the plurality of lenses are receivable by the lens frame in only a single orientation. The editable lens assembly also includes a pair of slide members coupled to the lens frame for permitting the lens frame to be slidably received by an instrument panel.

One embodiment of a method of editing an instrument assembly of a vehicle performed in accordance with the present invention is disclosed. The instrument assembly including a lens frame removably received by an instrument panel of the vehicle. The method includes selecting a first lens having a first icon disposed on the first lens from a plurality of lenses, wherein each of the plurality of lenses has a different icon disposed on the lens. The method also includes selecting a second lens having a second icon disposed on the second lens from the plurality of lenses and removably coupling the first and second lenses upon the lens frame. The method further includes removably coupling the lens frame to an instrument panel.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
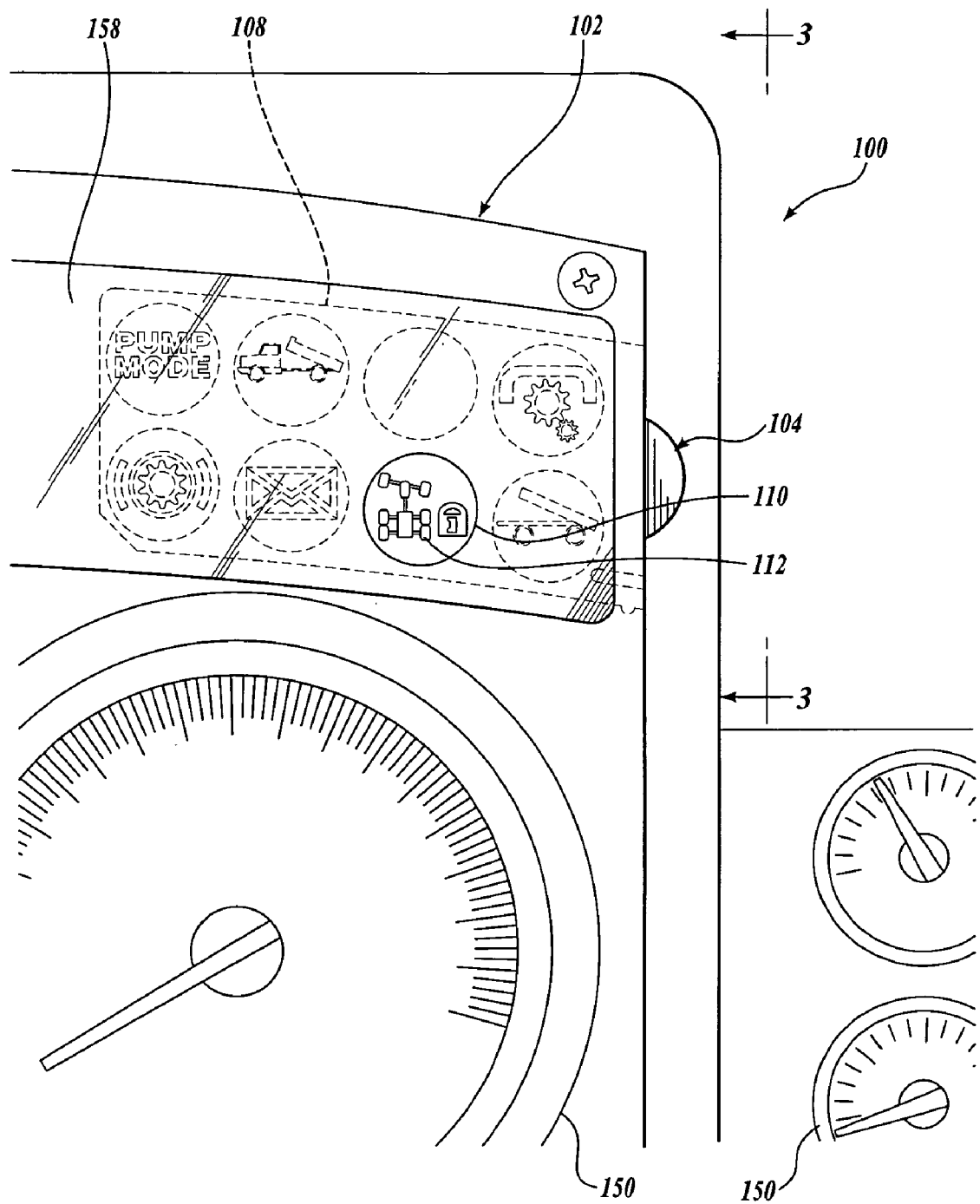
FIG. 1 is a front elevation view of one embodiment of an editable instrument assembly formed in accordance with the present invention shown with a lens assembly having been inserted within an instrument panel, wherein one of a plurality of lenses of the lens assembly is lit illuminating an icon disposed on the lens with the remaining lenses shown in phantom since they are hidden behind a dead face protective cover.

Referring to enclosed FIGS. 1-5, one embodiment of an editable instrument assembly 100 formed in accordance with the present invention is disclosed. Generally described and referring to FIG. 2, the editable instrument assembly 100 includes an instrument panel assembly 102 and a lens assembly 104. The instrument panel assembly 102 includes a plurality of indicator lights 106 which are adapted to selectively illuminate lenses 110 having icons 112 on them, thereby indicating a status or condition of some component of the vehicle (not shown). The lens assembly 104 includes a lens frame 108 in which the lenses 110 are coupled to. The lens assembly 104 may be removably coupled to the instrument panel assembly 102 such that the lenses 110 are each aligned to be in front of one of the indicator lights 106. The lens assembly 104 may also be removed from the instrument panel assembly 102 and the lenses 110 selectively removed and replaced with lenses 110 having different (or the same) icons. Thus, the icons 112 associated with the indicator lights 106 are easily editable either during initial installation, or editable after initial installation to accommodate the addition of new components to the vehicle, repair, etc.

Figure 4:
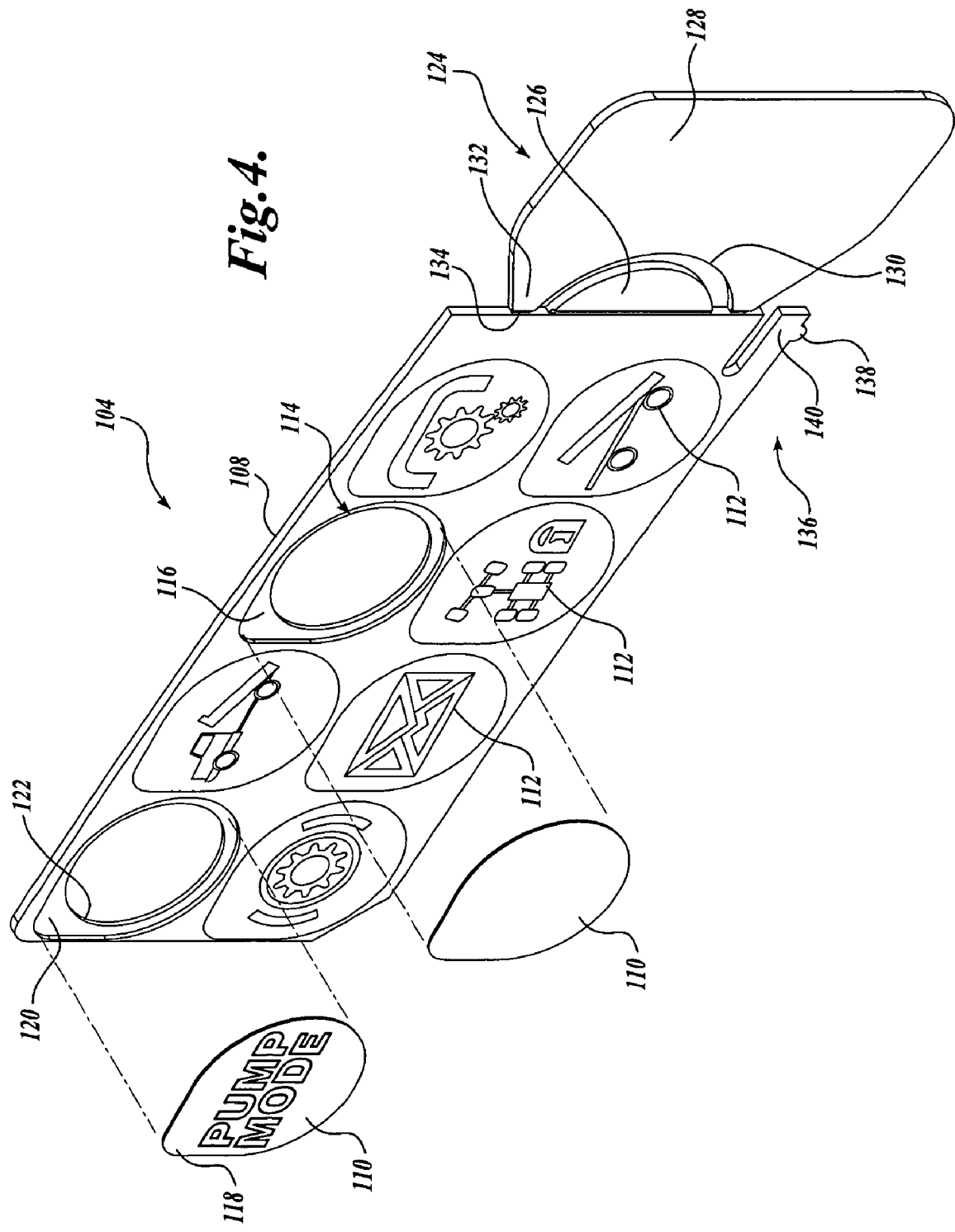
FIG. 4 is an exploded perspective view of the lens assembly of the editable instrument assembly of FIG. 1, shown with two lenses associated with the lens assembly prior to attachment to a lens frame of the lens assembly.
Figure 5:
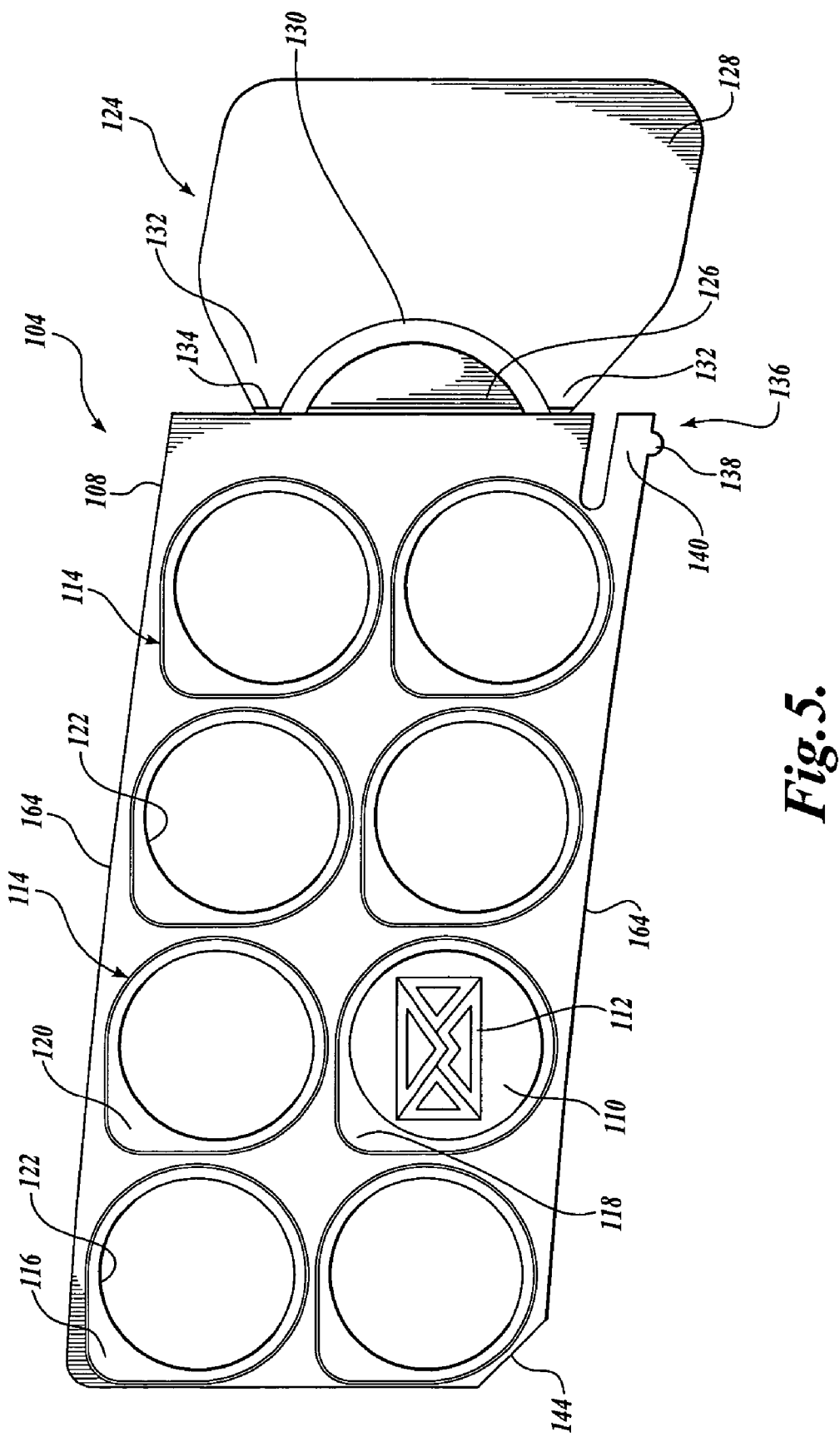
FIG. 5 is a top view of the lens assembly of FIG. 4 with only one of the plurality of lenses shown coupled to the lens frame.

In light of the above general description of the editable instrument assembly 100, the structure of the editable instrument assembly 100 will now be described in further detail, first focusing on the lens assembly 104. Turning to FIGS. 4 and 5, the lens assembly 104 includes the lens frame 108 and the plurality of lenses 110 mentioned above. The lens frame 108 is a substantially planar and rectangularly shaped member, though those skilled in the art will appreciate that other shapes are within the spirit and scope of the present invention, such as non-planar shapes and other geometric shapes other than rectangles. The lens frame 108 includes a plurality of lens receiving assemblies 114 disposed in an array on the lens frame 108. In the illustrated embodiment, there are eight lens receiving assemblies 114 disposed in two rows of four on the lens frame 108, however it should be apparent to those skilled in the art that any number of lens receiving assemblies 114 may be disposed in any order upon the lens frame 108.

Each lens receiving assembly 114 is adapted to removably receive one of the lenses 110. In the illustrated embodiment, each lens receiving assembly 114 includes a recess 116, or sunken portion disposed in the lens frame 108. In the illustrated embodiment, the lenses 110 are removably retained to the lens frame 108 through the use of an adhesive. The adhesive is preferably selected to permit each lens 110 to be separated from the lens frame 108 without damage, or at least without leaving any significant portion of the lens 110 adhered to the lens frame 108 such that the remaining portion would inhibit the attachment of a new lens to the lens receiving assembly 114. Although the illustrated and described embodiment is described as using an adhesive to removably attach the lenses 110 to the lens frame 108, it should be apparent to those skilled in the art that the lenses 110 may be removably, or non-removably, attached to the lens frame 108 in any suitable manner, such as by mechanical fasteners, snap fit methods, interference fit methods, quick to connect methods, etc. Although the lenses 110 may be permanently attached to the lens frame 108, it is noted that it is preferred that the lenses 110 are removably coupled to the lens frame 108 so that they may be removed and replaced at a later date.

Preferably, the lenses 110 and the lens receiving assemblies 114 are cooperatively shaped such that each of the plurality of lenses 110 is oriented in only a single predetermined direction when removably received by the lens frame 108. Moreover, in the illustrated embodiment, each lens 110 includes an extension 118 portion which is cooperatively received within a correspondingly shaped extension portion 120 of the recess 116. This arrangement ensures that each of the lenses 110 are oriented in a preselected orientation relative to the lens frame 108 such that the icons 112 printed on the lenses 110 are oriented correctly for viewing by the user.

The lens frame 108 includes a plurality of apertures 122 passing through the lens frame 108. The apertures permit light to pass through the lens frame 108 to light the lenses 110 and their associated icons 112. Alternately, the apertures 122 may be a piece of a translucent material for permitting light to pass through the aperture 122 to light the lenses 110 and their associated icons 112. The apertures 122 of the illustrated embodiment are circular and are located in the center of the recesses 116.

The lens frame 108 also includes a gripping assembly 124. The gripping assembly 124 permits a user to grip the lens assembly 104 during installation and removal of the lens assembly 104 from the instrument panel assembly. The gripping assembly 124 includes a permanent gripping handle or removal tab 126 and a removable gripping handle or insertion tab 128. The removal tab 126 is permanently coupled to a distal edge of the lens frame 108 and is semicircular in shape and coplanar with the rest of the lens frame 108.

The insertion tab 128, as the name implies, is removably coupled to the lens frame 108. The insertion tab 128 includes a semicircular cutout 130 which surrounds the smaller removal tab 126 such that the removal tab 126 is nestled within the insertion tab 128. The insertion tab 128 includes two legs 132. The distal ends of the legs 132 are removably coupled to the outward edge of the lens frame 108. Although the insertion tab 128 may be coupled to the lens frame 108 in any suitable matter, in the illustrated embodiment, the insertion tab 128 is coupled to the lens frame 108 by a breakaway connection 134. The breakaway connection 134 is a weak point permitting the insertion tab 128 to be flexed back and forth to cause the insertion tab 128 to be broken away from the lens frame 108 at the breakaway connections 134. The insertion tab 128 is adapted to help an installer grip the lens base 108 as the lens assembly 104 is inserted into the instrument panel assembly and then be broken off (removed) such that it does not get in the way and provides an aesthetically clean appearance. The smaller removal tab 126 still protrudes slightly from the instrument panel assembly allowing a user to grip the lens frame 108 of the lens assembly 104 to facilitate removal of the lens assembly 104 from the instrument panel assembly.

The lens frame 108 also includes a retaining assembly 136 for removably retaining the lens frame 108 to the instrument panel assembly. The retaining assembly 136 includes a protrusion 138 positioned on a biasing member 140. In the illustrated embodiment, the biasing member 140 is an arm that is flexible in nature and which applies an outward biasing force to the protrusion 138. The biasing member 140 biases the protrusion 138 outward into a corresponding shaped recess 142 in the instrument panel assembly 102 (see FIG. 1 for reference numerals 142 and 102) to removably retain the lens frame 108 to the instrument panel assembly once the lens assembly 104 is installed. Of note, the protrusion 138 and recess 142 (See FIG. 1) are positioned such that when the protrusion 138 is received within the recess 142, the lenses 110 are aligned correctly with the indicator lights 106 (See FIG. 2). Further, although the illustrated embodiment is described and illustrated with the protrusion 138 disposed on the lens frame 108 and the recess disposed on the instrument panel assembly, it will be appreciated by those skilled in the art that the recess may suitably be disposed on the lens frame and the protrusion disposed on the instrument panel assembly. Further still, although a protrusion and recess based retaining assembly is illustrated and described above, it should be apparent to those skilled in the art that any suitable means may be employed to retain the lens assembly 104 within the instrument panel assembly hereto know or to be developed.

Figure 2:
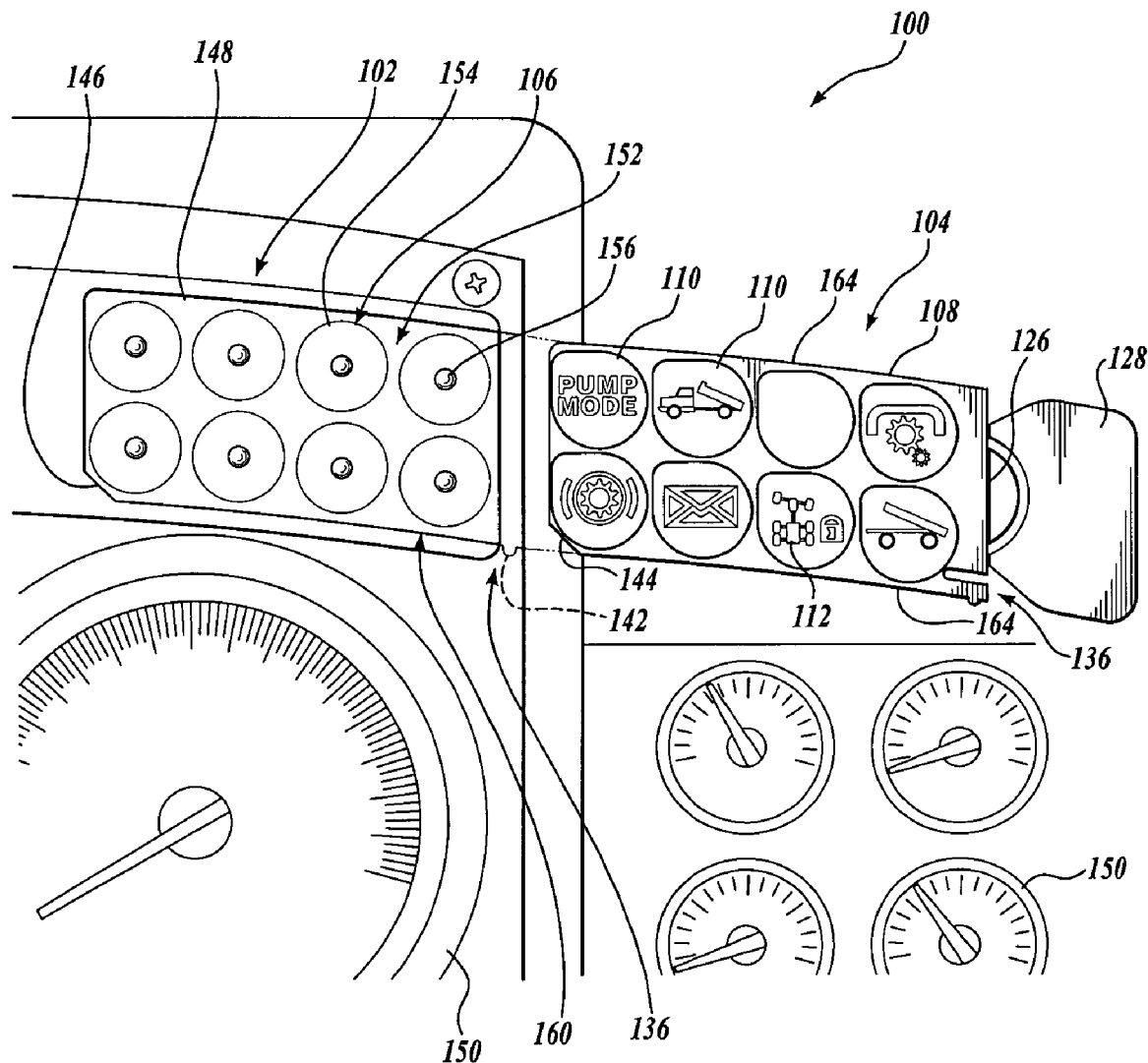
FIG. 2 is a front elevation view of the editable instrument assembly of FIG. 1 shown with the lens assembly just prior to insertion within the instrument panel and the dead face protective cover removed for clarity.

The lens frame 108 may include an alignment structure 144. In the illustrated embodiment, the alignment structure 144 is in the form of a truncated corner of the lens frame 108 forming, in effect, a keyway on the lens frame 108. Referring to FIG. 2, the alignment structure 144 is adapted to interface with a corresponding alignment structure 146 of the instrument panel assembly. In the illustrated embodiment, the alignment structure 146 is in the form of a filled in corner of a slot 148 formed in the instrument panel assembly 102, forming, in effect, a key on the instrument panel assembly 102. The alignment structures 144 and 146 interact with one another in a keyed relationship to permit the lens frame 108 to be oriented in only a single orientation relative to the instrument panel assembly 102 to help prevent installer orientation error.

Referring to FIG. 5, the lens frame 108 also includes a pair of slide members 164. The slide members 164 are formed by the side edges of the lens frame 108. The slide members 164 are adapted to be slidably received by the instrument panel assembly 102 as the lens assembly 104 is slidably received by a slot 148 in the instrument panel assembly 102 as will be described in greater detail below.

The lens frame 108 is suitably made from any rigid or semi-rigid material, a few suitable examples being plastic, metal, etc. Preferably, the lens frame 108 is made from an injection molding process as is well know to those skilled in the art.

Turning to FIG. 4, this detailed description will now focus on the lenses 110. The lenses 110 are made from a translucent or at least partially translucent material. The lenses 110 may be made from a colored material, a few examples being red, yellow, orange, red, green, or made from a clear material. The icons 112 may be printed on the lenses 110 in a negative manner or a positive manner, i.e., such that only the icon itself is printed with opaque ink, or such that only the outline of the icon is printed with an opaque ink, as is well known to those skilled in the art. The icons 112 may include text or images indicating a status or condition of a component of the vehicle, or blank, i.e., either entirely opaque or entirely translucent. Each lens 110 includes an extension 118 portion which is cooperatively received within the extension portion 120 of the recess 116 such that each of the lenses 110 are oriented in a preselected orientation relative to the lens frame 108 as described above when installed.

Turning to FIG. 2, this detailed description will now focus upon the instrument panel assembly 102. The instrument panel assembly 102 includes a plurality of well known gauges 150 and an indicator light assembly 152. The indicator light assembly 152 includes a plurality of light indicators 106. Each indicator light 106 includes a light socket 154 having a light source 156 disposed therein. The light source 156 may be selectively activated to illuminate a lens 110 and its associated icon 112 to indicate a condition or status of a component of the vehicle.

Referring to FIGS. 1 and 2, the indicator light assembly 152 includes a dead face 158. The dead face 158 is a tinted or semi-translucent panel that is used to hide the lenses 110 and their associated icons 112 when the light source 156 of each indicator light 106 is not lit. More specifically, the dead face 158 blocks enough ambient light from passing through the dead face 158 such that a user cannot see the lenses 110 and/or icons disposed below the dead face 158 during normal operation, the lenses 110 and their associated icons 112 only being visible when the indicator lights 106 are activated. This presents a clean, aesthetically pleasing front face for the instrument panel and impedes lights, such as sun glare, shining in on the instrument panel from falsely illuminating the lenses 110. The dead face 158 is preferably disposed in front of the lenses 110 such that the lenses 110 are sandwiched between the dead face 158 and the lens frame 108, with the dead face 158 facing the user. The dead face 158 is preferably tinted so that light is impeded from passing inward into the instrument panel toward the lenses but permitted to pass outward from the indicator lights 106 to the user. Of note, the dead face 158 has been removed from the instrument panel assembly 102 in FIG. 2 so that the indicator lights 106 are visible. With regard to FIG. 1, the dead face 158 is in place. In FIG. 1, one of the indicator lights is shown illuminating a lens 110 having an icon 112 disposed thereon. The other lenses 110 and icons 112 are hidden from view by the dead face 158 and are accordingly shown in phantom.

Figure 3:
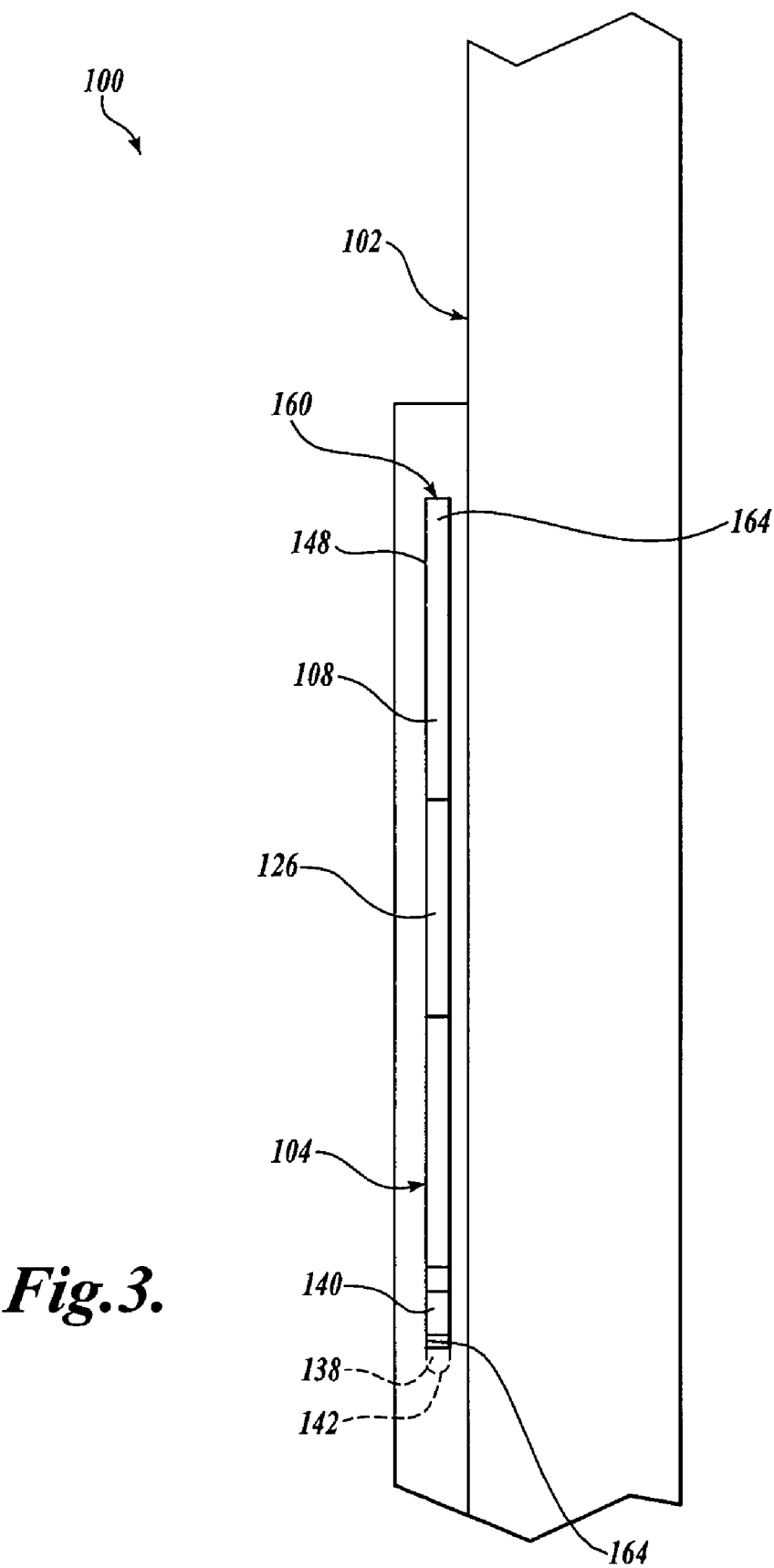
FIG. 3 is a right side cross-sectional, elevation view of the editable instrument assembly of FIG. 1 taken substantially through Section 3-3 of FIG. 1.

Referring to FIGS. 2 and 3, the instrument panel assembly 102 includes a lens frame receiving assembly 160. The lens frame receiving assembly 160 facilitates the removable interfacing of the lens assembly 104 to the instrument panel assembly 102. In the illustrated embodiment, the lens frame receiving assembly 160 includes a slot 148 for slidably receiving the slide members 164 of the lens assembly 104. The slot 148 of the lens frame receiving assembly 160 and the lens frame 108 are cooperatively shaped such that lens frame 108 may be oriented in only a single predetermined direction when removably received by the lens frame receiving assembly 160. Moreover, the lens frame 108 includes the alignment structure 144 described above adapted to interface with a cooperatively shaped alignment structure 146 of the lens frame receiving assembly 160 such that the lens frame 108 can only be oriented in a single predetermined direction relative to the lens frame receiving assembly 160. Although specific alignment structures 144 and 146 are illustrated and described, it is appreciated by those skilled in the art that other cooperatively shaped alignment structures are suitable for use with and are within the spirit and scope of the present invention. Further, although the illustrated and described embodiment includes means for the lens assembly 104 to be removably received by the instrument panel assembly 102 in a sliding manner, it should be apparent to those skilled in the art that the instrument panel assembly 102 may be removably received in any other suitable manner without departing from the spirit and scope of the invention.

Turning to FIG. 2, the editable instrument assembly further includes the retaining assembly 136 for removably retaining the lens assembly 104 to the lens frame receiving assembly 160. As described above, the retaining assembly 136 includes a protrusion 138 coupled to either the lens frame 108 or the instrument panel assembly 102 and a biasing member 140 coupled to the protrusion 138 for biasing the protrusion 138 into a recess 142 disposed on the other of the lens frame 108 or the instrument panel assembly 102. The retaining assembly 136 is adapted to hold the lens assembly 104 within the instrument panel assembly 102 during use. However, the retaining assembly 136 does not permanently couple the lens assembly 104 to the instrument panel assembly 102, permitting the lens assembly 104 to be removed from the lens frame receiving assembly 160 without tools by manually pulling on the lens frame 108, such as by grasping and pulling on the removal tab 126. Thus, the lens assembly 104 can be easily removed for changing of the lenses 110, maintenance, repair, etc., and conversely, easily inserted and recoupled to the instrument panel assembly 104 by simply sliding the lens assembly 104 in the slot 148 until the protrusion 138 is biased into the recess 142.

In light of the above description of the components making up the editable instrument assembly 100, the operation of the editable instrument assembly 100 will now be described. Referring to FIG. 2, a user selects a first lens having a first icon disposed on the first lens from a plurality of lenses, wherein each of the plurality of lenses has a different icon disposed on the lens. The user then presses the lenses 110 into one of the recess 116 (see FIG. 4) in the lens frame 108, removably snap fitting the lens 110 to the lens frame 108. A user then selects additional lenses having various icons disposed on the lenses from the plurality of lenses, and couples them to the lens frame 108. Once each of the recesses 116 in the lens frame 108 is filled with a lens 110, the lens assembly 104 is slid within the slot 148 such that the alignment structures 144 and 146 are cooperatively aligned, assuring that the lens frame 108 is correctly oriented relative to the instrument panel assembly 102. Further, since the lenses 110 each include an extension 118 (see FIG. 4) that is cooperatively received within an extension 120 (see FIG. 4) in the lens frame 108, the lenses 110 are also correctly oriented relative to the instrument panel assembly 102.

The user then grips the relatively large insertion tab 128 and slides the lens assembly 104 into the slot 148 of the lens frame receiving assembly 160. The retaining assembly 136 removably retains the lens assembly 104 within the instrument panel assembly 102 when the protrusion 138 is received within the recess 142. The insertion tab 128 is then flexed to cause the insertion tab 128 to break free from the lens frame 108. The insertion tab 128 is then removed from the lens frame 108 and disposed.

If for any reasons the lens assembly 104 is needed to be removed from the instrument panel assembly 102, the user grasps the removal tab 126 and pulls outward. With a relative small removal force manually applied, without the use of tools, the lens assembly 104 slides outward from the instrument panel assembly 102 and the protrusion 138 disengages from the recess 142. Once the lens assembly 104 is removed, any number of the lenses 110 may be removed and replaced with new lenses 110 having new or the same icons disposed thereon. The user may then grasp the removal tab 126 and reinsert the lens assembly 104 back into the instrument panel assembly 102.

Thus, the editable instrument assembly 100 is editable since the arrangement of the lenses 110 can be selected and rearranged at any time. For instance, the lenses 110 having the icons 112 of just the options actually purchased can be installed on the lens frame 108 and then the lens assembly 104 inserted into the instrument panel assembly 102 as shown in FIG. 2 during manufacturing of the vehicle. Thus, the lens assembly 104 can be tailored for each vehicle and the options the vehicle actually has, reducing the size of the instrument panel assembly 104 since indicator lights 106 and icons 112 for all possible options need not be present. Further, icons 112 can be added as options are later added to the vehicle by simply swapping out a lens having an icon 112 that is blank with one having an icon 112 associated with the added option. Further, the lens assembly 104 can be upgraded at a later date to include icons 112 not originally contemplated without having to replace the whole instrument panel assembly 102.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An editable instrument assembly for a vehicle comprising:
   (a) a plurality of lenses, each lens having an icon disposed thereon;
   (b) a lens frame, the lens frame adapted to removably receive each of the plurality of lenses; and
   (c) an instrument panel assembly comprising a lens frame receiving assembly for removably and slidably receiving the lens frame with the plurality of lenses and a plurality of indicator lights, each indicator light selectively connectable to a component of the vehicle and adapted to selectively illuminate a corresponding lens to indicate a status of the component of the vehicle, wherein the lens frame further includes a insertion tab adapted to be gripped by a user while the lens frame is removably and slidably received by the lens frame receiving assembly and that is adapted to be selectively removed from the lens frame after the lens frame is removably and slidably received by the lens frame receiving assembly.

2. The editable instrument assembly of claim 1, wherein the lens frame is adapted to be removed from the lens frame receiving assembly without tools by manually pulling on the lens frame.

3. The editable instrument assembly of claim 1, wherein the lens frame and each of the plurality of lenses are cooperatively shaped such that each of the plurality of lenses is orientateable in only a single predetermined direction when removably received by the lens frame.

4. The editable instrument assembly of claim 1, wherein the lens frame and the lens frame receiving assembly are cooperatively shaped such that lens frame may be oriented in only a single predetermined direction when removably received by the lens frame receiving assembly.

5. The editable instrument assembly of claim 1, wherein the insertion tab is a breakaway insertion tab that is adapted to be selectively broken off from the lens frame after the lens frame is removably and slidably received by the lens frame receiving assembly.

6. The editable instrument assembly of claim 1, wherein the lens frame further includes a removal tab at least partially surrounded by the insertion tab, the removal tab permanently attached to the lens frame.

7. The editable instrument assembly of claim 1, further comprising a retaining assembly for removably retaining the lens frame to the lens frame receiving assembly.

8. The editable instrument assembly of claim 7, wherein the retaining assembly includes a protrusion coupled to either the lens frame or the instrument panel and a biasing member coupled to the protrusion for biasing the protrusion into a recess disposed on the other of the lens frame or the instrument panel.

9. The editable instrument assembly of claim 1, wherein the instrument panel further includes a dead face, wherein the lens frame is inserted behind the dead face such that the plurality of lenses are disposed between the dead face and the lens frame.

10. An editable instrument assembly for a vehicle comprising:
 (a) a lens assembly including a plurality of lenses, each lens having a different icon disposed thereon, and a lens frame adapted to removably receive each of the plurality of lenses;
 (b) an instrument panel assembly including a plurality of indicator lights, each indicator light selectively connectable to a component of the vehicle and adapted to selectively illuminate a corresponding lens to indicate a status of the component of the vehicle; and
 (c) an insertion tab removably coupled to the lens frame, wherein the insertion tab is adapted to be gripped by a user to aid installation of the lens frame to the instrument panel assembly, the insertion tab removably coupled to the lens frame such that the insertion tab may be removed after the installation of the lens frame.

11. The editable instrument assembly of claim 10, wherein each lens may be selectively removed and replaced with a new lens.

12. The editable instrument assembly of claim 10, wherein the lens assembly may be removably coupled to the instrument panel assembly such that each lens is aligned to be in front of a corresponding indicator light.

13. The editable instrument assembly of claim 10, wherein the instrument panel assembly further includes a dead face, wherein the lens frame is inserted behind the dead face such that the plurality of lenses are disposed between the dead face and the lens frame.

14. An editable instrument assembly for a vehicle comprising:
 (a) a plurality of lenses, each lens having an icon disposed thereon;
 (b) a lens frame, the lens frame adapted to removably receive each of the plurality of lenses;
 (c) an instrument panel assembly comprising a lens frame receiving assembly for removably and slidably receiving the lens frame with the plurality of lenses and a plurality of indicator lights, each indicator light selectively connectable to a component of the vehicle and adapted to selectively illuminate a corresponding lens to indicate a status of the component of the vehicle; and
 (d) a retaining assembly for removably retaining the lens frame to the lens frame receiving assembly, wherein the retaining assembly includes a protrusion coupled to either the lens frame or the instrument panel and a biasing member coupled to the protrusion for biasing the protrusion into a recess disposed on the other of the lens frame or the instrument panel.

15. An editable instrument assembly for a vehicle comprising:
 (a) a lens assembly including a plurality of lenses, each lens having a different icon disposed thereon, and a lens frame adapted to removably receive each of the plurality of lenses;
 (b) an instrument panel assembly including a plurality of indicator lights, each indicator light selectively connectable to a component of the vehicle and adapted to selectively illuminate a corresponding lens to indicate a status of the component of the vehicle; and
 (c) a retaining assembly for removably retaining the lens frame to the lens frame receiving assembly, wherein the retaining assembly includes a protrusion coupled to either the lens frame or the instrument panel and a biasing member coupled to the protrusion for biasing the protrusion into a recess disposed on the other of the lens frame or the instrument panel.

\* \* \* \* \*

UNITED STATES PATENT AND TRADEMARK OFFICE
CERTIFICATE OF CORRECTION

| | | |
|---|---|---|
| PATENT NO. | : 7,667,904 B2 | Page 1 of 1 |
| APPLICATION NO. | : 11/077972 | |
| DATED | : February 23, 2010 | |
| INVENTOR(S) | : Lewis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 856 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,667,904 B2 | |
| APPLICATION NO. | : 11/077972 | |
| DATED | : February 23, 2010 | |
| INVENTOR(S) | : B. R.-D. Lewis et al. | |

It is certified that error appears in the above-identified patent and that said Letters Patent is hereby corrected as shown below:

| COLUMN | LINE | |
|---|---|---|
| 8 (Claim 1, | 35 line 14) | "a insertion" should read --an insertion-- |

Signed and Sealed this
Eighth Day of March, 2011

David J. Kappos
*Director of the United States Patent and Trademark Office*